US010352276B2

(12) United States Patent
Ricordi

(10) Patent No.: US 10,352,276 B2
(45) Date of Patent: Jul. 16, 2019

(54) REMOVABLE ADAPTER FOR AIR AND FUEL INTAKE AND MIXING IN A COMBUSTION TOOL

(71) Applicant: ILLINOIS TOOL WORKS INC., Glenview, IL (US)

(72) Inventor: Christian Ricordi, Bourg les Valence (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/390,047

(22) PCT Filed: Apr. 2, 2013

(86) PCT No.: PCT/US2013/034895
§ 371 (c)(1),
(2) Date: Oct. 2, 2014

(87) PCT Pub. No.: WO2013/151965
PCT Pub. Date: Oct. 10, 2013

(65) Prior Publication Data
US 2015/0047608 A1 Feb. 19, 2015

(30) Foreign Application Priority Data
Apr. 3, 2012 (FR) .................................. 12 53039

(51) Int. Cl.
*F02M 21/04* (2006.01)
*F02M 35/024* (2006.01)
*B25C 1/08* (2006.01)

(52) U.S. Cl.
CPC ............. *F02M 21/047* (2013.01); *B25C 1/08* (2013.01); *F02M 35/02416* (2013.01)

(58) Field of Classification Search
CPC .. F02M 21/04; F02M 21/047; F02M 21/0239; F02M 21/023; F02M 21/0278; F02M 21/0281; F02M 35/02416; F02M 35/10006; F02M 61/00; F02M 61/145; F02M 61/165; F02M 61/168; B25C 1/08
USPC .......................... 123/429, 46 R; 227/8, 9, 10
See application file for complete search history.

(56) References Cited

U.S. PATENT DOCUMENTS

| 4,403,722 | A | * | 9/1983 | Nikolich | ................ | B25C 1/008 |
| | | | | | | 227/10 |
| 4,711,225 | A | | 12/1987 | Holderle et al. | | |
| 6,647,969 | B1 | | 11/2003 | Adams | | |

(Continued)

FOREIGN PATENT DOCUMENTS

| CN | 1607325 A | 4/2005 |
| CN | 1811153 A | 8/2006 |

(Continued)

OTHER PUBLICATIONS

ISR for PCT/US2013/034895 dated Jun. 5, 2013.
Office Action issued in Canadian Patent Application No. 2,862,206 dated Mar. 11, 2016.

*Primary Examiner* — Grant Moubry
(74) *Attorney, Agent, or Firm* — Thompson Hine LLP

(57) ABSTRACT

According to the invention, the adapter is arranged to be mounted in the tool, to be connected to a fuel cartridge and to receive fuel and communicate with a combustion chamber so as to inject a mixture of external air and fuel therein.

9 Claims, 2 Drawing Sheets

(56) References Cited

U.S. PATENT DOCUMENTS

Figure 1:
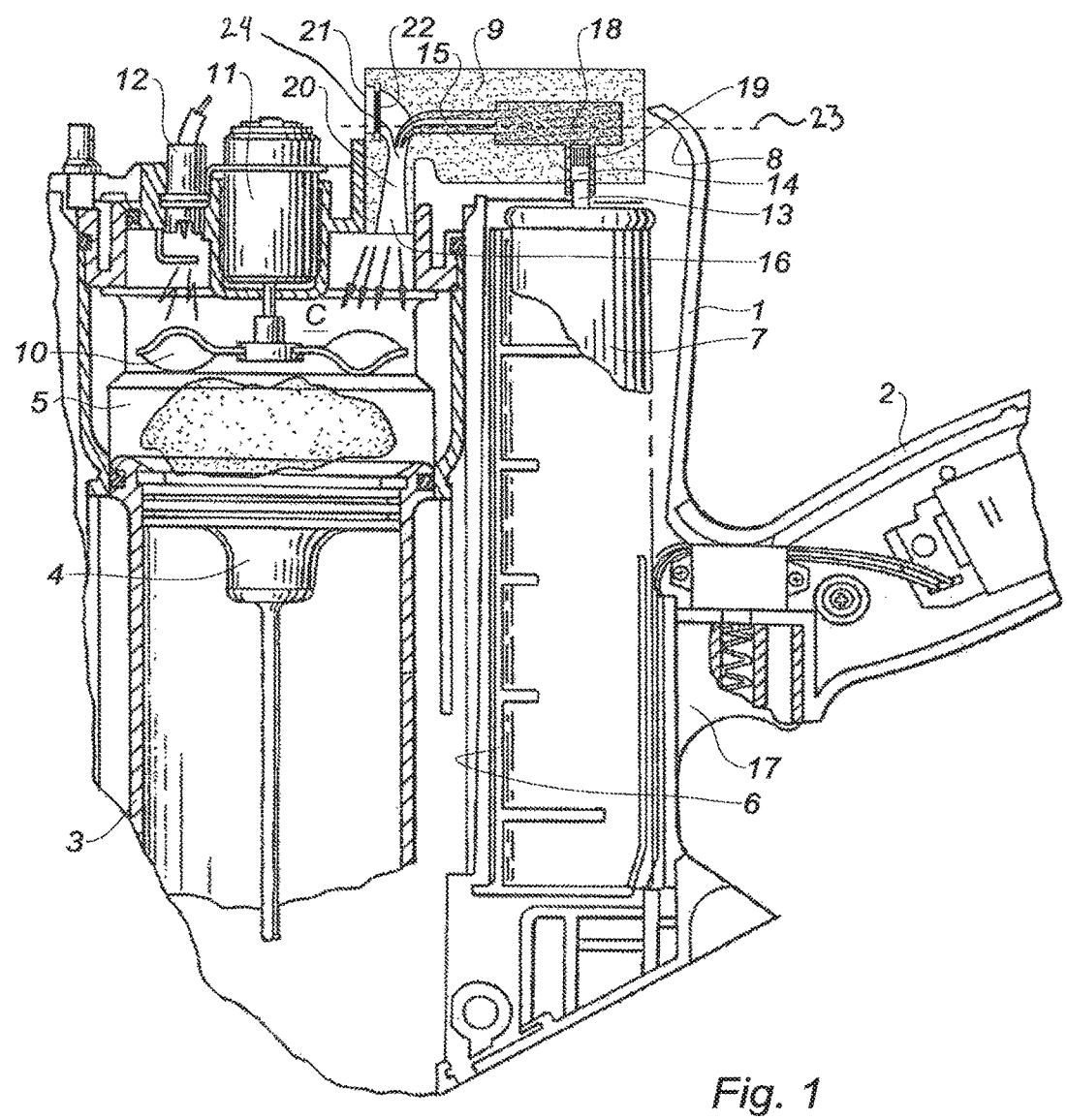

| | | | |
|---|---|---|---|
| 6,722,550 B1* | 4/2004 | Ricordi | B25C 1/08 123/46 SC |
| 7,314,025 B2* | 1/2008 | Shkolnikov | B25C 1/08 123/46 H |
| 7,392,922 B2* | 7/2008 | Vanstaan | B25C 1/08 222/402.1 |
| 7,571,841 B2* | 8/2009 | Gibson | B25C 1/08 227/10 |
| 7,594,599 B2 | 9/2009 | Webb | |
| 7,857,881 B2* | 12/2010 | Sato | B01D 46/0002 123/184.32 |
| 7,980,440 B2* | 7/2011 | Hahn | B25C 1/08 123/46 SC |
| 8,091,751 B2 | 1/2012 | Tanaka | |
| 8,113,403 B2* | 2/2012 | Tanaka | B25C 1/08 227/10 |
| 8,302,831 B2* | 11/2012 | Taylor | B25C 1/08 227/10 |
| 8,544,710 B2* | 10/2013 | Tanaka | B25C 1/08 227/10 |
| 8,550,321 B2* | 10/2013 | Webb | B25C 1/08 123/46 SC |
| 2005/0045138 A1 | 3/2005 | Schmidt et al. | |
| 2006/0042572 A1 | 3/2006 | Nishikawa et al. | |
| 2006/0163755 A1 | 7/2006 | Prager | |
| 2007/0012267 A1 | 1/2007 | Shkolnikov et al. | |
| 2008/0169326 A1 | 7/2008 | Moeller et al. | |
| 2008/0203133 A1* | 8/2008 | Webb | B25C 1/08 227/10 |
| 2008/0314952 A1 | 12/2008 | Tamura et al. | |
| 2010/0108734 A1* | 5/2010 | Adams | B25C 1/08 227/9 |
| 2010/0108736 A1 | 5/2010 | Tanaka | |
| 2012/0097727 A1* | 4/2012 | Ricordi | B25C 1/08 227/9 |
| 2012/0181319 A1* | 7/2012 | Iijima | B25B 21/023 227/8 |
| 2012/0211539 A1* | 8/2012 | Kosuge | B25C 1/08 227/9 |
| 2012/0222654 A1* | 9/2012 | Kosuge | B25C 1/08 123/472 |
| 2012/0267417 A1* | 10/2012 | Vanstaan | B25C 1/08 227/9 |
| 2013/0087108 A1* | 4/2013 | Gschwend | B25C 1/08 123/2 |

FOREIGN PATENT DOCUMENTS

| | | |
|---|---|---|
| CN | 101142060 A | 3/2008 |
| CN | 101218069 A | 7/2008 |
| CN | 101389449 A | 3/2009 |
| CN | 101652545 A | 2/2010 |
| CN | 102458774 A | 5/2012 |
| EP | 1987924 A1 | 11/2008 |
| EP | 2131026 A1 | 12/2009 |
| WO | 2007000031 A1 | 1/2007 |
| WO | 2010150215 A1 | 12/2010 |

* cited by examiner

REMOVABLE ADAPTER FOR AIR AND FUEL INTAKE AND MIXING IN A COMBUSTION TOOL

RELATED APPLICATIONS

The present application is a National Phase of International Application Number PCT/US2013/034895 filed Apr. 2, 2013 and claims priority to French Application Number 1253039 Apr. 3, 2012.

PRIOR ART

Internal combustion fixing tools use a mixture of air and fuel burning in a combustion chamber and provide the power for performing a work, for example driving nails or staples.

Such tools generally use a cartridge providing them in fuel. Such a cartridge is adapted on the tool both for being strongly fastened therein upon the operation, as well as for providing a sealing fuel supply from the inside of the cartridge until the combustion chamber of the tool. When a cartridge is empty, it is replaced by another one. Such cartridges are consumable items. According to the tool type, the dosage of the quantity of fuel can be performed on different ways, for example either through a dosing valve being integrated into the cartridge, or through a dosing valve being integrated into the adapter of the cartridge, or through a dosing valve being integrated into the tool. On some tools, a fuel filtering device can also be provided, for avoiding that impurities disturb the dosage or the circulation of the fuel towards the combustion chamber. Such fuel filtering device is however not systematic and is generally limited to apparatus implementing a dosing device being integrated into the tool, in particular a solenoid valve.

The internal combustion fixing tools also comprise one or more air intake orifices. Such air is provided for being introduced in the combustion chamber and mixed with fuel so as to insure the combustion and provide a work. Such air intake generally comprises a filtering device adapted for avoiding the introduction in the combustion chamber of dusts and other foreign bodies, particularly spread in the places where such tools are used. According to the tool type, the air filter can be removable so as to be cleaned or, the case being, replaced if it is damaged.

The extended use of such tools progressively leads to their fouling and to modifications of their operating characteristics both at the level of the fuel pathway and of the air passage. Such fouling needs specific maintenance operations so as to put back the tool in a clean condition re-establishing optimal performances. These interventions are sometimes carried out by the user, or by a cleaner after sales upon a return to the workshop. Such maintenance operations need the use of powerful cleaning products, as well as the immobilization of the apparatus, which must be removed and cleaned in depth. Such operation, although being indispensable for the good operation of the apparatus, may be forgotten or postponed by the user, thereby reducing the performances and the longevity of the tool.

Thus, the invention aims at proposing a removable adapter being able to be arranged in the tool and containing the air intake manifold and the fuel injection pathway.

With this end in view, the invention relates to a removable adapter for external air and fuel intake and mixing in an internal combustion fixing tool, comprising a combustion chamber, arranged to be mounted in the tool, to be connected to a fuel cartridge and to receive a dose from and communicate with the combustion chamber so as to inject a mixture of external air and fuel therein.

The replacement of such a removable adapter allows the full characteristics to be recovered at each replacement and thus a due removal of the tool in depth to be avoided. The air intake and fuel distribution functions are thus performed by such removable adapter. Moreover, such adapter can also implement integrated filters so as to filter the admitted air and/or fuel.

Advantageously, the adapter of the invention comprises a venturi arranged to drive the external air admitted in the adapter and to mix it with the fuel upon the intake of the latter.

Still advantageously, the adapter comprises a fuel dosing device.

The adapter can comprise means being arranged so as to connect the adapter to a fuel cartridge housed in the tool by a direct assembling on it.

The invention still relates to an internal combustion fixing tool comprising a combustion chamber, a reception housing for a fuel cartridge in a casing provided with external air intake louvers, characterized in that it comprises a reception housing for an adapter of the invention, in which an adapter is housed or not.

Figure 2:
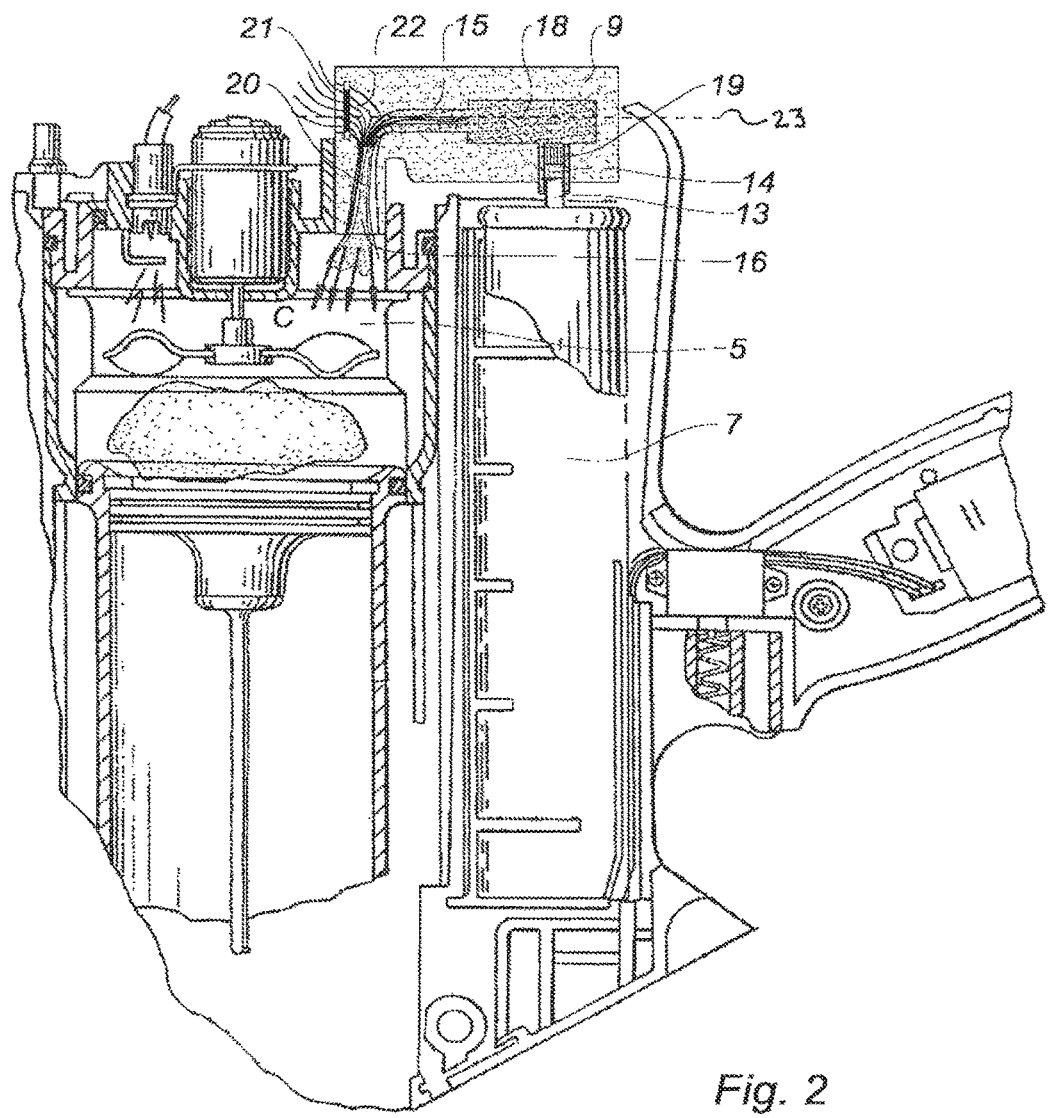

The invention will be better understood with the help of the following description of an internal combustion fixing tool, comprising an adapter according to the invention, referring to the accompanying drawing, wherein:

FIG. 1 is a partial section view with, in the housing thereof, a fuel cartridge and an adapter according to the invention, out of operation, and FIG. 2 is a view similar to FIG. 1, the adapter being in operation and distributing, in the combustion chamber, a mixture of external air and fuel.

The tool represented on the drawing is here a manual operation tool and comprises, in a casing 1, extended by an operation handle 2, a cylinder 3, in which a propelling piston 4 can be driven in movement to drive here a nail into a support material, a combustion chamber 5, a housing 6 for reception of a fuel cartridge and in which a cartridge 7 is housed, and a housing 8 for reception of an external air and fuel intake and mixing adapter of the cartridge 7 and in which an adapter 9 is housed.

Apart from the housing of the adapter and of the adapter itself, the tool is perfectly known from the man of the art.

The rear part of the casing 1, not represented, comprises external air intake louvers that could be plugged upon firings. In the example being considered, a fan 10 is provided in the combustion chamber 5, the rotation driving of which is ensured by a motor 11. A spark plug 12 allows the mixture in the chamber 5 to be fired.

The fuel cartridge 7 comprises a fuel ejection tip 13 which is mounted on a spring and, when this tip is pushed against the action of such spring, fuel can escape from the cartridge.

The adapter 9 comprises an intake orifice 14 for receiving the cartridge tip 13.

The adapter 9, in an operating position, is thereby fitted on the tip 13 in an ejection position. Thus, the adapter can be mounted directly on the cartridge 7. The adapter 9 is configured such that the adapter 9 has a longitudinal axis 23 that extends in a different direction than a longitudinal direction of the fixing tool and a longitudinal direction of the fuel cartridge 7.

However, the adapter here comprises a dosing valve 18 on the fuel pathway 15, between the intake orifice 14 and the outlet 16 of the adapter. The valve, so as to be able to supply one dose of fuel, is controlled generally by abutting the tool against the part to be fastened. The control, through an operating trigger 17 arranged in the handle 2 of the tool, can be possible. A filter 19 is arranged in the intake orifice 14 of the adapter, upstream from the valve 18.

The fuel pathway 15, downstream from the valve 18, opens into an outlet channel 20 extending between the outlet 16 and an external air inlet 21, a channel in which the mixture of fuel and external air is performed. The outlet channel 20 extending between the outlet 16 and the external air inlet 21 forms a venturi 24. An air filter 22 is arranged at the air inlet 21 of the mixing channel 20, the inlet of which operates as an air manifold. The outlet 16 of the channel 20 opens directly into the combustion chamber 5.

Due to the removable character of the adapter 9, it can be easily replaced by another completely new one providing characteristics being advantageous for an optimum operation of the tool.

The invention claimed is:

1. A removable adapter, the removable adapter configured for external air and fuel intake and mixing, the removable adapter being for an internal combustion fixing tool comprising a combustion chamber, the combustion chamber arranged to be mounted in the tool, the combustion chamber configured to be connected to a fuel cartridge and to receive fuel and a mixture of external air, both of which are injected therein, wherein the adapter is configured such that the adapter has a longitudinal axis that extends in a different direction than a longitudinal direction of the fixing tool and a longitudinal direction of the fuel cartridge, wherein an outlet channel extending between an outlet of the adapter and an external air inlet forming a venturi is provided, being arranged to drive external air admitted in the adapter and mix it with the fuel.

2. The adapter according to claim 1, wherein an air intake manifold is provided for bringing external air in the combustion chamber of the tool and a fuel pathway for bringing fuel from the fuel cartridge to the combustion chamber.

3. The adapter according to claim 1, further comprising a fuel dosing device.

4. The adapter according to claim 1, further comprising a fuel filtering device.

5. The adapter according to claim 1, further comprising an air filtering device.

6. The adapter according to claim 1, wherein the adapter is mounted directly to the fuel cartridge.

7. The tool according to claim 1, wherein the adapter is housed within the tool.

8. The adapter according to claim 1, wherein the venturi is provided, being arranged to drive external air admitted in the adapter and mix it with the fuel under an effect of an introduction of the fuel.

9. The adapter according to claim 1, wherein the venturi is provided, being arranged to drive external air admitted in the adapter and mix it with the fuel upon the intake of the fuel.

* * * * *